United States Patent [19]

Heiman et al.

[11] Patent Number: 5,197,338
[45] Date of Patent: Mar. 30, 1993

[54] SYSTEM AND METHOD FOR DETERMINING TORQUE OUTPUT OF MOTOR ACTUATED VALVE OPERATORS

[75] Inventors: Stephen M. Heiman, Exton; Michael J. Delzingaro, Glenside, both of Pa.

[73] Assignee: Liberty Technology Center, Inc., Conshohocken, Pa.

[21] Appl. No.: 734,378

[22] Filed: Jul. 22, 1991

[51] Int. Cl.⁵ .............................................. G01L 3/02
[52] U.S. Cl. .................................. 73/862.29; 73/168
[58] Field of Search ............... 73/168, 862.29, 862.31, 73/862.35, 862.08, 862.191, 862.195, 862.321, 862.322

[56] References Cited

U.S. PATENT DOCUMENTS

| | | | |
|---|---|---|---|
| 4,498,336 | 2/1985 | Dalton | 73/862.29 X |
| 4,759,224 | 7/1988 | Charbonneau et al. | 73/862.29 X |
| 4,787,245 | 11/1988 | Anderson et al. | 73/168 |
| 4,805,451 | 2/1989 | Leon | 73/862.31 X |

OTHER PUBLICATIONS

Article "Get a Better Grip with Frictional Shaft Mounts" by Paul Dvorak, *Machine Design*, 7 pages.
"Limitorque Valve Controls" Manual Type HBC, Bulletin 15-73, 1 sheet, Linitorque Corporation.
"A Typical HBC Gear Operator", p. 3, Limotorque Corporation.

*Primary Examiner*—Michael T. Razavi
*Assistant Examiner*—Elizabeth L. Shopbell
*Attorney, Agent, or Firm*—Panitch Schwarze Jacobs & Nadel

[57] ABSTRACT

A system for determining torque generated by a motor actuated operator driving a partial turn valve including a torque ring replacing the cover of the operator housing, a frictional shaft coupling member coupling the inner circumferential surface of the drive sleeve within the operator housing to the central shaft of a torque plug projecting from the operator through the torque ring. Two or more stops are provided projecting from the torque ring on either side of the central shaft. A cross member is provided extending radially outwardly from the central shaft of the torque plug to contact each of the stops when the operator is driven. A sensor, preferably an array of strain gauges mounted to the central shaft, generates a signal proportional to the torque applied by the operator to the operator housing through the frictional shaft coupling and the torque plug. The system can be used to calibrate torque switches typically associated with the motor actuator of the operator or corrolate another parameter of the motor actuated operator, such as an actuator spring pack force or displacement which varies with torque load, so as to measure torque indirectly from such parameter.

17 Claims, 4 Drawing Sheets

SYSTEM AND METHOD FOR DETERMINING TORQUE OUTPUT OF MOTOR ACTUATED VALVE OPERATORS

FIELD OF THE INVENTION

The present invention relates generally to motor actuated mechanical operators and, more particularly, to a system and method for sensing torque being developed by motor actuated, partial turn valve operators, installed in plants.

BACKGROUND OF THE INVENTION

Motorized operators for quarter turn or butterfly valves and other partial turn valves (e.g. ball or plug) typically include both a reversible, motorized actuator and a partial turn operator. The motorized actuator typically rotates a geared down shaft which drives the partial turn operator. The partial turn operator also typically drives the valve shaft through a reduction gear arrangement.

Motorized operation is typically controlled by a pair of adjustable position limit switches. However, torque switches are also typically provided for backup control. The torque switches shut off or stop the operation of the motor when the torque in the actuator is sufficient to move the actuator spring pack a preset distance necessary to trip either switch. The torque and position limit switches are typically associated with the motor/actuator.

Motor operated, quarter turn butterfly valves are commonly used in nuclear and other power plants to perform routine opening and closing of water and steam lines and, more importantly, for those valves designated as safety related, to perform such opening or closing to assure the prompt, safe shutdown of the plant under accident or other emergency or abnormal operating conditions. For those valves of this class whose safety function is to open or close a water, steam or other line, it is important that the torque switches be properly adjusted to the particular set of plant operating conditions which may be encountered. If a torque switch setting is too low, it may impede proper operation by shutting off power to the motor before full opening or closing of the valve is achieved. If the torque switch setting is too high, it may not prevent the valve or actuator from being damaged in the event of excessive torque due to valve malfunction or an obstruction to valve operation.

Torque switches are set according to specific valve design specifications including type of valve, and specific operating conditions such as temperature, flow, and pressure. The manufacturer's recommended open and close torque settings are sometimes displayed on the torque switch calibration tag on the actuator. Torque switches are typically provided with dials bearing incremental, numbered markings (e.g., 1-5). However, these markings do not correspond with absolute torque values.

As the actual numerical setting of the torque switch is an arbitrary number, and the relation of one switch setting to another can vary significantly, torque switches could be set to specific torque values only by bench testing before installation or after removal. In-plant torque switch adjustments have typically consisted of verifying that full valve closure is achieved prior to close torque switch cut off. If this does not happen, implying that the close torque switch has been set too low, a small adjustment is made and the procedure is repeated. After successful completion of this procedure, the only information that is definitely known about the torque switch settings is that they are sufficiently high enough not to impede the nominal valve closure.

It would be desirable to determine the actual torque output at the operator for both the opening and closing torque switch operation during on-site testing of a fully assembled and on-line motorized valve operator. It would be desirable to achieve this by applying a non-intrusive artificial load to the valve operator, which accurately represents an applied valve torque load, and measuring that load as it is driven to torque switch trip. It is usually not possible to achieve sufficient torque load to trip the torque switches simply by closing the valve against its seat in the no-flow condition. This is because the seats are typically elastomeric, and would be damaged for that amount of torque. The maximum torque levels on the full flow condition are developed before full closure, and these are typically less than the torque required for torque switch trip. In obtaining the actual numerical torque values for torque switch settings, a better assessment of initial settings, as well as performance changes due to wear, aging or maintenance activities can be accurately accounted for.

SUMMARY OF THE INVENTION

In one aspect, the invention is a system for determining torque generated by a motorized partial rotation valve operator including a housing containing a rotary drive member, the drive member having a pair of opposing axial ends, one end being accessible through an opening in the housing and a remaining end being coupled to a valve stem. The system further comprises a torque plug including a central shaft fixedly coupled with the one end of the drive member, the torque plug further including a pair of stop surfaces extending generally radially away from the central shaft in different directions. The system still further comprises a pair of stops fixedly coupled with the housing to extend from the housing on opposing sides of the central shaft and positioned for approximately simultaneous contact with the pair of stop surfaces when the drive member and the torque plug are rotated. The system still further comprises sensor means for generating an electrical signal proportional to the torque transmitted through the torque plug and stops.

In another aspect, the invention is a method of determining torque supplied by a motorized partial rotation operator to a valve stem coupled with the operator, the operator including a rotary drive member in a housing, the drive member being coupled with the valve stem. The method comprises the steps of activating the motor to transmit a torque through the drive member; applying the torque transmitted through the drive member to the housing at at least a pair of points on the housing spaced from one another on opposite sides of the drive member; and generating a signal proportional to the torque being applied by the drive member to the housing.

BRIEF DESCRIPTION OF THE DRAWINGS

The foregoing summary, as well as the following detailed description of the presently preferred embodiments of the invention, will be better understood when read in conjunction with the appended drawings. It

Figure 1:
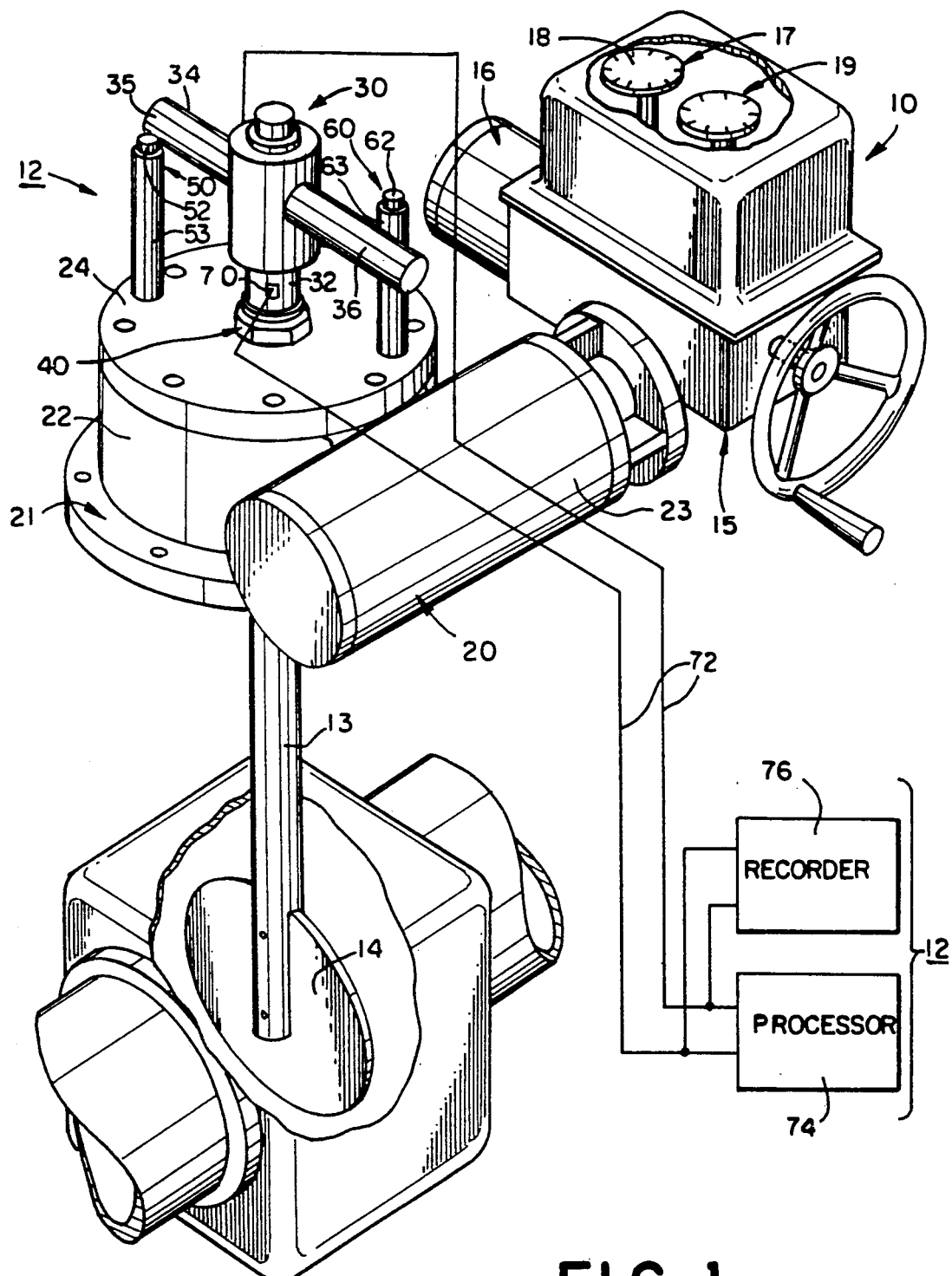
Figure 2:
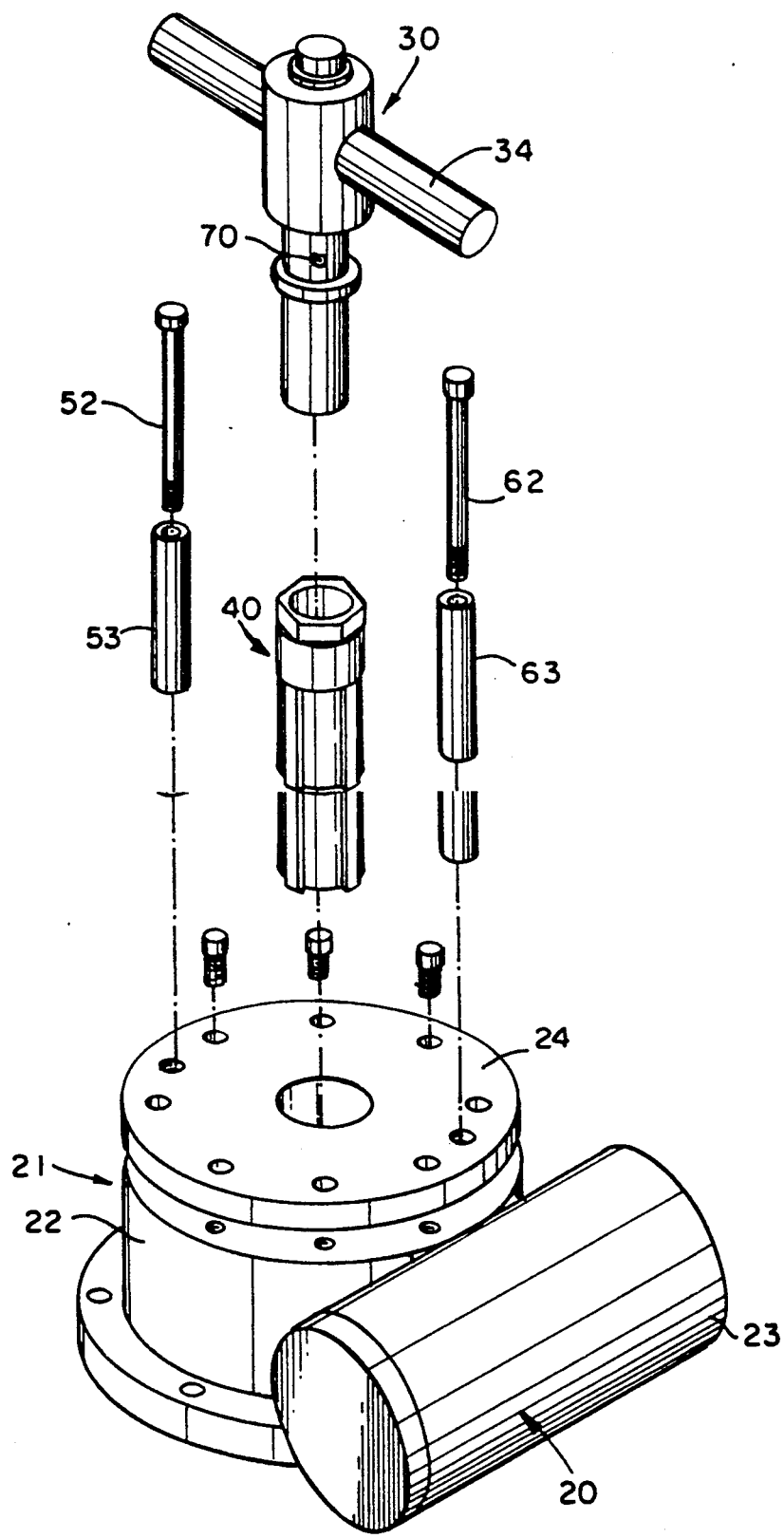
Figure 3:
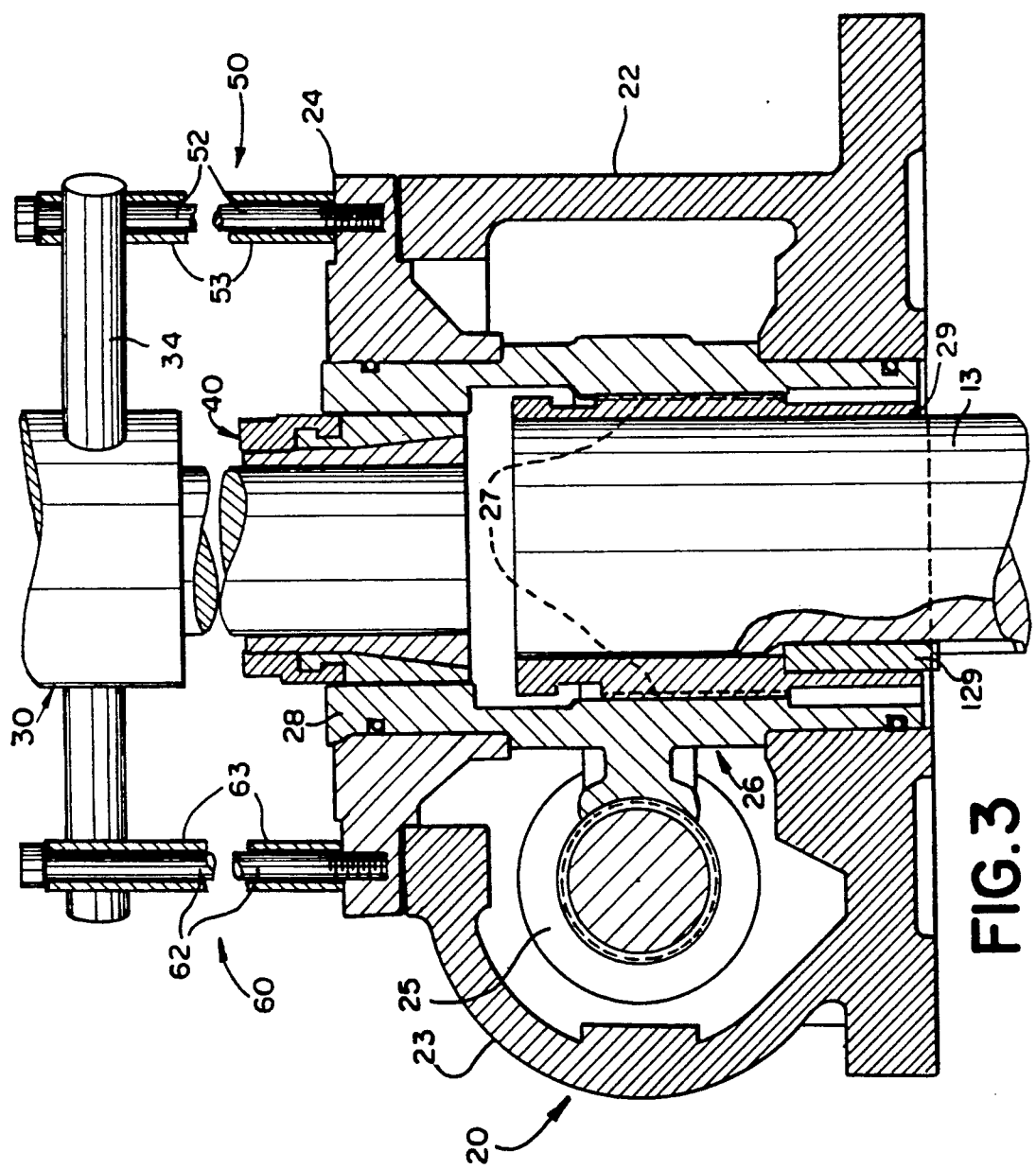

3 should be understood, however, that the invention is not limited to the precise arrangements illustrated. In the drawings:

FIG. 1 is a diagrammatic view of a typical motor actuated, quarter turn valve operator in which the torque determining system of the present invention has been installed;

FIG. 2 is a diagrammatic exploded view of the operator and system in FIG. 1;

FIG. 3 is a diagrammatic cross-sectional view through the operator and

Figure 4:
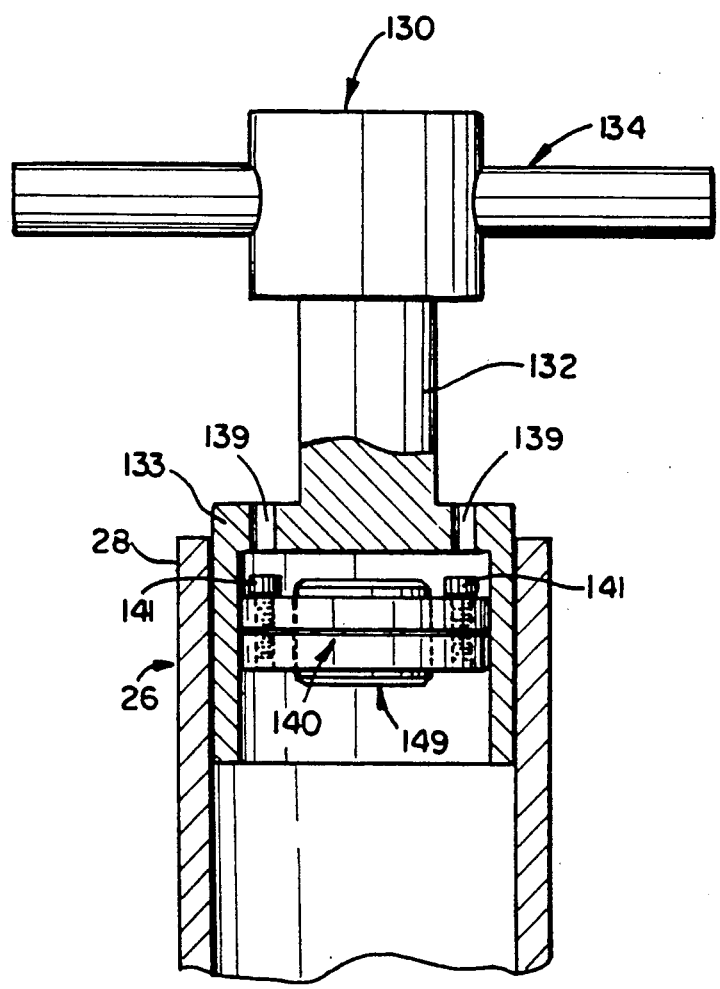

FIG. 4 is a diagrammatic perspective of an alternate embodiment system of the invention mounted on a larger motorized valve operator.

DETAILED DESCRIPTION OF THE PREFERRED EMBODIMENTS

Referring now to the drawings, in which like reference numerals identify like elements throughout the several views, there is shown in FIG. 1 a motorized valve operator assembly, indicated generally at 10, for a quarter turn or butterfly rotary valve, indicated generally at 14 and the installation of a first embodiment torque determining system of the present invention, indicated generally at 12. The motorized operator assembly 10 includes an actuator, indicated generally at 15, coupled with and driven by a reversible electric motor, indicated at 16. Actuator 15 gears down the rotary output from electric motor 16 and transfers it at right angles to the rotary operator, indicated generally at 20.

The operator 20 includes a housing, indicated generally at 21, which includes a sleeve portion 22 and a smaller, worm portion 23. Operator 20 is coupled through valve stem 13 to the partial turn butterfly valve 14. The housing of operator 20 is also fixedly coupled to the body of valve 14 through a yoke. The yoke is entirely conventional and is omitted from the figures for clarity.

The motorized operator assembly 10, valve stem 13 and valve 14 are entirely conventional. The motorized operator 10, illustrated diagrammatically in the figures, is considered typical of at least a majority of all partial turn, motorized valve controls in use in power plants throughout the United States.

Referring to FIG. 3, sleeve portion 22 of operator housing 20 receives and supports a rotary output drive member or drive sleeve 26. Smaller housing portion 23, mounted tangentially with sleeve portion 22, contains and supports a worm 25 coupling the drive sleeve 26 with the actuator 15. The left side of the operator 20 is broken away through the worm 25 and the drive sleeve 26 where the worm and drive sleeve meet.

Still referring to FIG. 3, the lower end of drive sleeve 26 is typically provided with inner circumferential splines 27 and accepts a tubular adaptor 29. Adaptor 29 is externally splined and internally coupled by key 129 to the stem 13 of the valve 14 in an entirely conventional fashion. Since there is a lack of relative motion in the operator 20 between the various splined and keyed couplings, essentially all of the torque delivered by the drive sleeve 26 can be considered to have been received at the valve stem 13, in normal operation.

A remaining radial end 28 of the sleeve 26, the upper radial end in the figures, has generally smooth inner and outer circumferential surfaces above the splines. The inner surface is typically accessible through a opening

4 in a removable cover, which is itself typically bolted to the top of the sleeve portion of housing 21.

The original cover of the housing 21 would typically have been provided with a central opening which would normally receive a small cap disc screwed into the upper end of the drive sleeve 26. The cap disk would cover the opening and visually indicate the position of the valve by means of a small metal arrow provided on the disc. The cap disc is not required for valve operation and can be removed.

Preferably, the system 12 of the present invention replaces the operator housing cover with a torque ring 24, which is substantially similar to the original cover except for certain modifications which will be noted below. The housing 21 and torque ring 24 include lower and upper bearing surfaces, respectively, for rotatably supporting the drive sleeve 26. One of ordinary skill will appreciate that the cover might be used in place of the described torque ring for receiving the stops and passing the torque plug 30 to the drive sleeve 26 in the manner to be described. However, the use of separate torque ring 24 permits the provision of a sleeve bearing having a slightly larger inner diameter to accommodate expansion of the sleeve 26 and larger stops, as will be described.

The preferred components of the preferred torque determining system 12 of the present invention are depicted in the upper left and lower right sides of FIG. 1. A number of the components of the preferred system 12 are mounted to the operator 20. These preferably include a torque ring 24, bolted to the sleeve portion 22 of the housing 21, a torque plug 30, a keyless frictional coupling 40, also sometimes referred to as a keyless locking bushing or keyless shaft mount which couples plug 30 with drive sleeve 26, and a pair of opposed identical stops 50 and 60.

The torque plug 30 preferably includes a one-piece, solid central shaft 32, preferably perpendicularly bored to its central axis at its upper end to slidably receive a cross member 34. The outer circumferential surface of the cross member 34 provides a pair of stop surfaces 35 and 36 which are located on generally diametrically opposing sides of the central shaft 32. The axial ends of the cross member 34 extend generally radially away from the central shaft 32, in opposing directions, sufficiently to contact the stops 50 and 60, respectively.

The pair of stops 50 and 60 preferably extend from the torque ring 24 on diametrically opposing sides of the central shaft 32 so as to be positioned for simultaneous contact with the stop surfaces 35 and 36 of cross member 34 when the drive sleeve 26 and torque plug 30 are rotated. Each of the stops 50 and 60 may be provided in a variety of ways. In the embodiment of FIGS. 1 through 3, each stop 50 and 60 is provided by an elongated bolt 52, 62, respectively, which is received in a separate one of a pair of bores provided on diametrically opposing sides of the torque ring 24 and plug 30. Bolts 52 and 62 are also preferably received in a pair of cylindrical sleeves 53 and 63, respectively, and in tapped bores in the torque ring 24. The right side of FIG. 3 is broken away through the sleeve portion 22 between the stops 50 and 60 to illustrate this construction. Washers can be provided between the sleeves 53, 63 and the ring 23 for load distribution, if desired.

Torque ring 24 is similar to a cover of the operator housing 21 which it replaces. A central opening is provided in the torque ring 24 to expose the inner circumferential surface of the sleeve 26 to the coupling 40.

Preferably, a bearing (not separately depicted) is pressed into the central opening of the ring to rotatably support the upper end of the drive sleeve 26. The bearing opening is a few mils greater in diameter than the opening normally provided in the original housing cover. This slightly larger opening better accommodates the slight expansion which the upper end 28 of the sleeve 26 typically undergoes when the outer diameter of the frictional coupling 40 is expanded. A circle of bolt holes is provided for mounting the torque ring 24 to the mounting holes provided in the top flange of the sleeve portion 22 of the housing 21 for mounting the original operator cover. The holes are uniformly spaced in the circle around the center of the central opening. The taped bores for the stops 50 and 60 are preferably located as close to the circle of bolt holes as the sleeve portion 22 of the housing and the drive sleeve 26 permit. It is also possible to enlarge the torque ring so that it laps over the outside of housing portion 22 and locate the stops outside the ring of bolt holes and the housing to reduce the forces on the stops.

The preferred system 12 further preferably includes sensor means for generating an electrical signal at least proportional to the torque developed between the torque plug 30 and the housing 21 when the pair of stop surfaces 35 and 36 impact against the stops 50 and 60, respectively. In FIGS. 1-3, the sensor means are provided by at least two and preferably four strain gauge elements, one being indicated at 70, which are affixed to the central shaft 32, oriented at forty-five degrees to the central axis of the central shaft 32, and wired into a Wheatstone bridge configuration so as to generate an electric output signal proportional to the torque developed in the central shaft 32 of the torque plug 30 when the shaft 32 is under load and the bridge is powered by a suitable electrical input. The signal may be processed, preferably immediately, as is indicated diagrammatically by the provision of a pair of lines 72 carrying the signal to a processor 74, or recorded, as is indicated diagrammatically by the provision of a recording apparatus 76, or both.

The keyless frictional coupling 40 may be any of a variety of devices which are available from any of a variety of commercial sources in the United States including, but not limited to Fenner Manheim, Manheim, Pa.; SKF Component Systems Company, Bethlehem, Pa.; Bikon Corp., Monroe, N.Y.; Helland Research, Minneapolis, Minn.; Ringfeder Corp., Westwood, N.J.; Winfred M. Berg, Inc., East Rockaway, N.Y.; and Advanced Machine & Engineering Company, Rockford, Ill. Each such device is generally tubular and operates by the tightening or releasing of one or a plurality of screws or bolts, which cause portions of the coupling forming its inner circumference surface to expand inwardly, thereby reducing the inner diameter of the coupling. Most of these devices also simultaneously expand portions of the coupling forming its outer circumferential surface, thereby increasing the outer diameter of the coupling, as well. Keyless frictional couplings which change only in inner diameter are sometimes referred to specifically as "shrink discs". Expansion/contraction may be accomplished mechanically or hydraulically in different couplings.

The particular coupling 40 selected will depend upon the dimensions and characteristics of the operator 20 on which the system 12 is mounted. For example, Fenner Manheim Standard Series 1½ or 2 inch diameter couplings are presently preferred for Limitorque motor driven valve operator Models H0BC AND H1BC, while either a Bikon 4000 Series 50×80 or a DO Bikon H.D. Series 1012 55×85 is believed suitable for use with a Limitorque H2BC motorized operator. These preferred couplings engage solely by friction. These are believed to constitute a majority of all partial turn motor actuated valve operators currently in use in power plants in the United States. Other keyless frictional coupling and torque plug configurations may be desirable or necessary for the operators of other manufacturers and for larger operators.

As motorized operators increase in size, and torsional outputs, provisions must be made for transferring torsional outputs through the keyless frictional coupling. One possible alternate embodiment of the system, for example, for use with a Limitorque Model H2BC operator, is depicted diagrammatically in FIG. 4. A torque plug 130 is provided with a split tubular lower end 133 which fits within the inner circumferential surface of the upper radial end 28 of drive sleeve 26. A keyless frictional coupling 140 is received within the tubular lower end 133 and is used to expand the tubular lower end 133 against the inner circumferential surface of the drive sleeve 26. The Bikon couplings previously referred to are provided with a plurality (6 or 12) of uniformly spaced Allen screws. Access to the screws is provided by an identical number of appropriately positioned bores 139 through the horizontal flange portion of the central shaft 132 of plug 130. A torque ring like torque ring 24 is preferably provided with elongated stop bolts like bolts 52,62 but of greater diameter (one-half inch) than the bolts used to affix such torque ring to the sleeve portion 22 of the housing 21.

Operation of the various embodiments of the system 12 with various types of motorized valve operators is straightforward. The components of the system 12 are installed on the motorized operator 10. The stops 50 and 60 are preferably positioned to be impacted between the fully closed and fully opened position of the valve. The motor 16 is powered to rotate the drive sleeve 26 and plug 30 such that the cross member 34 contacts the stops 50 and 60. Once contact is made with stops 50 and 60, a resistive torque load is developed through the housing, stops and torque plug to the sleeve. In this way, the system 12 applies a torque transmitted from the drive sleeve 26 to the housing 21 at at least a pair of points on the housing 21 spaced from one another on opposite sides of the drive sleeve 26 and, through the strain gauges 70, generates a signal proportional to the torque being applied by the drive sleeve 26 to the housing 21. Without the system of the present invention, torque would normally be provided from the sleeve to the valve stem and returned by the yoke to the operator housing.

Typically, the torque switches respond to movement of a spring pack. Using the processor 74, an operator can determine the actual torque sustained by the plug 30 throughout the process. Since there is essentially no relative movement between the plug 30 and the drive sleeve 26 or between the drive sleeve 26 and a keyed valve stem 13 with which it is normally used, the torque delivered by the drive sleeve to the plug can be considered to be substantially equal to the torque delivered by the drive sleeve to the valve stem, in normal operation. Knowing the actual torque being delivered to the plug when the switch 17 or 19 was tripped, the torque switch 17 or 19 may then be adjusted closer to a desired torque load setting. The motor 16 can be reversed and then readvanced to retrigger the same torque switch and verify the triggering torque of the new switch setting.

The system 12 can be mounted on a motorized valve operator already installed in a plant to compare the actual torque delivered through the drive sleeve when the torque switch is tripped, with earlier values determined with the system 12 during earlier testing sessions. A change in the condition of the motor/actuator/operator upstream from the drive sleeve, or in the valve bearing or bushing, will be reflected in a change of output torque sensed at the plug.

It is further envisioned that the system of the present invention could be used with other sensors or systems to correlate the actual torque being determined by the present system with another parameter of the motorized operator. For example, motion of or compression force on the spring pack associated with the actuator can be correlated to torque output through the drive sleeve with a spring pack position or force sensor. Output of such sensor could thereafter be used to determine generally the torque being outputted through the drive sleeve.

An important aspect of the invention is the provision of at least two stops 50 and 60 uniformly radially spaced from and angularly spaced around the central shaft 32 which results in the imposition of equal uniform tangential forces on the plug central shaft 32. The developed load, although applied differently from the actual valve load, accurately reproduces the load at the valve stem for two reasons: one, it is an essentially purely torsional load with no net transverse force on the central axis of the drive sleeve; and two, the load as measured at the drive sleeve through the plug is indicative of the load at the valve stem because of the near totally efficient splined and keyed coupling between the drive sleeve and the valve stem.

While a pair of diametrically positioned stops are preferred for ease of use and ease of construction of the corresponding torque plug, it will be appreciated by those of ordinary skill in the art that more esoteric and complex torque plugs can be devised having more than two stop surfaces for simultaneously contacting more than two stops to reduce the net force applied on each stop. Two stops and the indicated slidable cross member are adequate to permit exercising of motorized operators in both directions without further repositioning or adjustment of the system, other than moving the cross member from one side of each stop to an opposing side of each stop. However, it is also possible to provide two pairs of diametrically opposed stops which are spaced and located to permit less than about ninety degrees of rotation of the cross member between adjoining pairs of the stops. This permits sensing torque in both directions of operator movement without having to remove and reinstall the cross member.

Although it is currently preferred that the sensor means be provided in the manner described, it is clear that the torque being applied by the sleeve 26 to the housing 21 can be determined with any of a variety of sensors mounted in any of a variety of ways between the sleeve and the housing. For example, torque can be determined using appropriate sensors detecting the degree of bending of either stop or the compressive force on the stop where the stop surface of the cross member contacts the stop. Similarly, bending or compressive loads being sustained by the cross member can be similarly sensed, converted to an electrical signal and then used to determine the torque.

It is also known that a relationship exists between the torque developed and the torque switch trip point which depends on the rate at which the torque load is applied. Typically, higher torques and higher forces can be generated before tripping by applying torque load at a higher rate. The structural elements which cause a load to build up through the torque plug have a predictable and repeatable compliance which governs the rate of loading. Therefore, various rates of loading can be simulated and the resulting torque switch trip points recorded by modifying the compliance of these elements. In the simplest form, this can be achieved, for example, by replacing the constant diameter cross member 34 with a bar which tapers down at its longitudinal ends but which maintains the strength of the previously described uniform diameter bar. Such a bar bends more in response to the load, effectively slowing down the rate of loading. In addition or in the alternative, intermediate elastic members can be inserted between the stops and the stop surfaces of the cross member which will require compression before the load from the cross member can be effectively transferred to the stop. Most quarter turn or butterfly valves with which the system would actually be used develop torque load from fluid forces on the valve disc and/or by action of the disc against an elastomeric seat. Thus, actual rate-of-loading is typically low, and modifications to the basic systems disclosed in FIGS. 1 through 4 to reduce the effective rate of loading of the stop would more accurately duplicate actual load expected to be encountered.

From the foregoing description, it can be seen that the present invention provides a self-contained system which permits the on site torsional measurement and calibration of partial turn rotary valve operators, which permits the monitoring of the efficiency of the operator, and which permits the performance of other operations such as the adjustment of the torque limit switches. The system further permits essential duplication of valve load on the operator by transmitting an essentially purely torsional load like that which the valve would deliver to the operator.

While preferred embodiments have been disclosed, and modifications thereto disclosed or suggested, it will be recognized by those skilled in the art that changes could be made to the above-described embodiments and to these modifications without departing from the broad inventive concepts thereof. It is understood, therefore, that this invention is not limited to the particular embodiments disclosed but is intended to cover any modifications which are within the scope and spirit of the invention, as defined by the appended claims.

We claim:

1. A system for determining torque generated by a motorized partial rotation valve operator including a housing containing a rotary drive member, the drive member having a pair of opposing axial ends, one end being accessible through an opening in the housing and a remaining end being coupled to a valve stem, the system comprising:

a torque plug including a central shaft frictionally coupled with the one end of the drive member for movement with the drive member and the valve stem, the torque plug further including a pair of stop surfaces extending generally radially away from the central shaft in different directions;

a pair of stops fixedly coupled with the housing to extend from the housing on opposing sides of the central shaft and positioned for approximately simultaneous contact with the pair of stop surfaces when the drive member and the torque plug are rotated; and sensor means of r generating an electrical signal proportional to the torque transmitted through the torque plug and stops.

2. The system of claim 1 further comprising a keyless coupling device fixedly coupling the drive member and the torque plug together by friction.

3. The system of claim 2 wherein the keyless coupling device frictionally engages an inner circumferential surface of the drive member.

4. The system of claim 1 wherein the sensor means comprises a plurality of strain gauges mounted to the central shaft of the plug.

5. The system of claim 1 further comprising a torque ring fixedly mountable to the housing with a plurality of bolts and with the pair of stops extending outwardly from the torque ring.

6. The system of claim 1 wherein the torque plug comprises a cross member perpendicularly coupled with the central shaft and having an outer surface providing the stop surfaces.

7. The system of claim 6 wherein the cross member is slidably received within a bore extending perpendicularly through the central shaft.

8. A method of determining torque supplied by a motorized partial rotation operator to a valve stem coupled with the operator, the operator including a rotary drive member in a housing, the drive member being coupled with the valve stem, comprising the steps of:

frictionally coupling a torque plug with the drive member for movement with the drive member and the valve stem coupled with the drive member;

activating the motor to transmit a torque through the drive member to the valve stem and frictionally to the torque plug;

applying the torque transmitted frictionally between the drive member and the torque plug to the housing at at least a pair of points on the housing spaced from one another on opposite sides of the drive member; and generating a signal proportional to the torque being applied by the drive member and the torque plug to the housing.

9. The method of claim 8 wherein the motorized operator further includes an adjustable torque switch for switching off a motor of the operator, and further comprising the steps of determining torque at the drive member from the signal and adjusting the torque switch in response to the determined torque.

10. The method of claim 8 wherein the torque transmitted through the drive member is applied to the housing generally uniformly around the drive member.

11. The method of claim 8 wherein an essentially purely torsional load is applied from the housing to the drive member.

12. The method of claim 8 wherein the initial step of frictionally coupling comprises coupling the torque plug with an accessible end of the drive member solely by friction and wherein the applying step comprises transmitting torque from the drive member to the torque plug solely through the friction of the coupling.

13. The method of claim 8 wherein the valve stem remains coupled to the rotary drive member for rotation by the rotary drive member during the activating, applying and generating steps.

14. The method of claim 12 wherein the valve stem remains coupled to the rotary drive member for rotation by the rotary drive member during the activating, applying and generating steps.

15. The system of claim 2 wherein one end of the torque plug central shaft is frictionally coupled with one end of the drive member, and wherein the one end of at least one of the torque plug central shaft and the drive member is hollow and internally receives the keyless coupling device and the remaining one of the drive member and the torque plug central shaft.

16. The system of claim 15 wherein the keyless coupling device has a central opening and wherein the remaining one of the drive member and the torque plug central shaft is received in the central opening of the keyless coupling device.

17. The system of claim 15 wherein the remaining one of the drive member and torque plug central shaft is also hollow and also internally receives the keyless coupling device.

* * * * *